United States Patent
Gray et al.

(10) Patent No.: US 6,587,770 B1
(45) Date of Patent: Jul. 1, 2003

(54) VEHICLE SEAT OCCUPANT WEIGHT ESTIMATION METHOD WITH FLOOR WEIGHT COMPENSATION

(75) Inventors: Charles A. Gray, Noblesville, IN (US); Duane D. Fortune, Lebanon, IN (US); Morgan D. Murphy, Kokomo, IN (US); Phillip E Kaltenbacher, II, Kokomo, IN (US); James F. Patterson, Greentown, IN (US); Stuart S. Sullivan, Peru, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/082,460

(22) Filed: Feb. 26, 2002

(51) Int. Cl.[7] .............................. G01G 1/00; G01G 3/12; G06F 7/00
(52) U.S. Cl. ...................... 701/45; 280/728.1; 280/735; 180/268
(58) Field of Search .............................. 701/45, 46, 47, 701/36; 280/728.1, 735, 734; 307/10.6; 180/268

(56) References Cited

U.S. PATENT DOCUMENTS 5,987,370 A * 11/1999 Murphy et al. ................ 701/45
6,101,436 A * 8/2000 Fortune et al. ................ 701/45
6,246,936 B1 * 6/2001 Murphy et al. ................ 701/45
6,364,352 B1 * 4/2002 Norton ......................... 280/735

FOREIGN PATENT DOCUMENTS

JP        11228045    * 11/1999    ............. B66B/3/00

* cited by examiner

*Primary Examiner*—Yonel Beaulieu
(74) *Attorney, Agent, or Firm*—Robert M. Sigler

(57) ABSTRACT

An improved vehicle seat occupant weight estimation method detects weight applied to both the seat cushion and the floor forward of the seat, and increases the measured seat weight of the occupant to account for occupant weight off-loaded to the floor. Fluid-filled bladders or other sensors are arranged to detect occupant seat weight and the weight applied to the vehicle floor forward of the seat. Upon opening of a vehicle door or an off-to-on transition of the vehicle ignition switch, the seat and floor weight sensors are monitored to detect the presence of an occupant. When the seat becomes occupied, or whenever there is a large change in the measured seat weight, the seat and floor weight are recorded, the occupant weight is estimated according to the recorded seat weight, and the inflatable restraints are allowed or suppressed based on the estimated occupant weight. When a sustained occupant weight shift is detected, the estimated occupant weight is increased in proportion to the amount of weight shifting, but is limited to a maximum value based on the detected floor and seat weights.

10 Claims, 2 Drawing Sheets

VEHICLE SEAT OCCUPANT WEIGHT ESTIMATION METHOD WITH FLOOR WEIGHT COMPENSATION

TECHNICAL FIELD

This invention relates to a method of estimating the weight of a vehicle seat occupant for purposes of allowing or suppressing deployment of inflatable restraints, and more particularly to a method of compensating the estimated occupant weight based on weight applied to the vehicle floor forward of the seat.

BACKGROUND OF THE INVENTION

Vehicle seat occupant weight estimation systems are useful in connection with air bags and other pyrotechnically deployed restraints as a means of characterizing the occupant for purposes of determining whether to allow or suppress deployment of the restraints. Typically, deployment is allowed for a child or small adult occupant, suppressed or reduced in force for a small child, and suppressed when an infant seat is detected. See, for example, the U.S. Pat. Nos. 5987370, 6101436, 6138067 and 6246936, which are assigned to the assignee of the present invention and incorporated herein by reference. The systems described in such patents measure the fluid pressure in a seat cushion bladder as an indication of occupant weight, and compare the indicated weight to one or more thresholds to appropriately characterize the occupant. Alternatively, the seat occupant weight can be estimated with a different type of sensor, such as a seat cushion pad having a number of cells that vary in resistance or capacitance due to the presence of an occupant.

Regardless of how the occupant seat weight is detected, under-estimation of the occupant weight can occur in cases where a significant portion of the occupant's weight is off-loaded to the vehicle floor forward of the seat. The degree of such off-loading will of course vary with the posture of the occupant, the seat height and inclination, and so on, and clinical evaluation of this phenomenon reveals that the off-loaded weight is typically about 30% of the full occupant weight. While it would be desirable to somehow compensate the estimated occupant weight for weight applied to the floor forward of the seat, it is not readily apparent how such compensation could be achieved out since the occupant may place various objects such as sports equipment or a heavy purse or grocery bag on the floor, and such objects are not indicative of occupant weight. Accordingly, what is needed is a method of detecting weight applied to the floor forward of a vehicle seat, and discerning what portion of the detected floor weight is attributable to the occupant for purposes of suitably compensating an estimated weight of the occupant.

SUMMARY OF THE INVENTION

The present invention is directed to an improved vehicle seat occupant weight estimation method that detects weight applied to both the seat cushion and the floor forward of the seat, and that increases the measured seat weight of the occupant to account for occupant weight off-loaded to the floor. In the preferred embodiment, fluid-filled bladders are arranged to detect occupant seat weight and the weight applied to the vehicle floor forward of the seat. Upon opening of a vehicle door or an off-to-on transition of the vehicle ignition switch, the seat and floor weight sensors are monitored to detect the presence of an occupant. When the seat becomes occupied, or whenever there is a large change in the measured seat weight, the seat and floor weight are recorded, the occupant weight is estimated according to the recorded seat weight, and the inflatable restraints are allowed or suppressed based on the estimated occupant weight. When a sustained shift in occupant weight is detected, the estimated occupant weight is increased in proportion to the amount of weight shifting, but is limited to a maximum value based on the detected floor and seat weights.

DESCRIPTION OF THE PREFERRED EMBODIMENT

Figure 3:
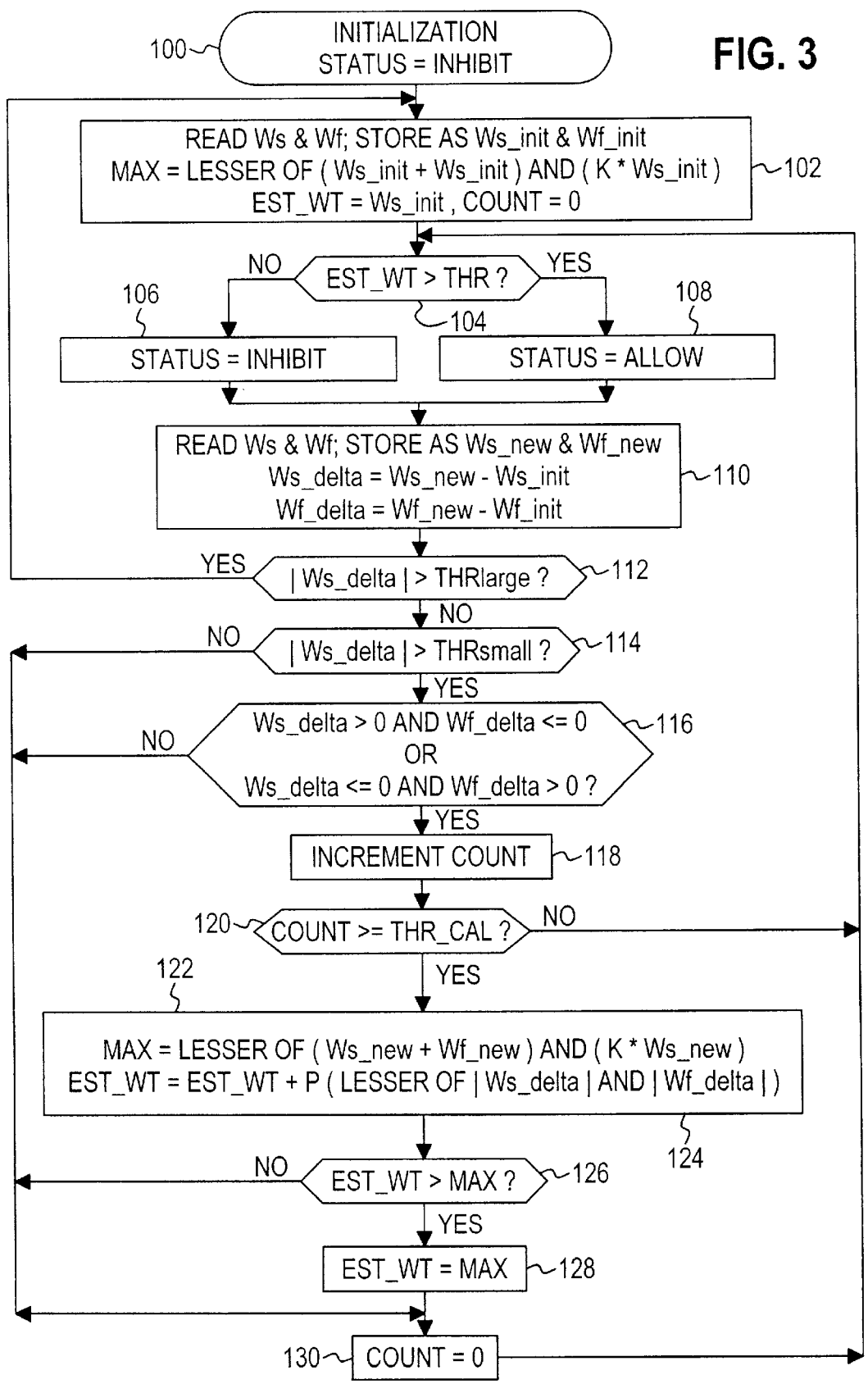
FIG. 3 is a flow diagram representative of a software routine executed by the ODM of FIG. 1 in carrying out the method of this invention.

The present invention is disclosed in the context of a restraint system for an occupant of a vehicle seat 10, where the occupant weight is estimated based measurements of the fluid pressure in first and second fluid-filled bladders 12 and 14. The bladder 12 is disposed in or under the seat bottom foam cushion 16 as shown, and the bladder 14 is disposed forward of the seat 10 between the vehicle floor pan 18 and a floor covering 20. In general, occupant weight applied to the cushion 16 and the floor covering 20 increases the respective pressure measurements, and the degree to which the measured pressures exceed the pressures which occur when the seat 10 is unoccupied provides an indication of the occupant weight applied to the seat 10 and floor covering 20. Thus, the bladders 12 and 14 each include an integral pressure sensor, and electrical signals corresponding to the sensed pressures are applied as inputs to a microprocessor-based occupant detection module (ODM) 22 via lines 24 and 26, respectively. In general, ODM 22 executes a software routine as described below in reference to the flow diagram of FIG. 3 for estimating occupant weight based on the measured pressures, and for allowing or suppressing deployment of inflatable restraints for the occupant based on the estimated weight.

Figure 1:
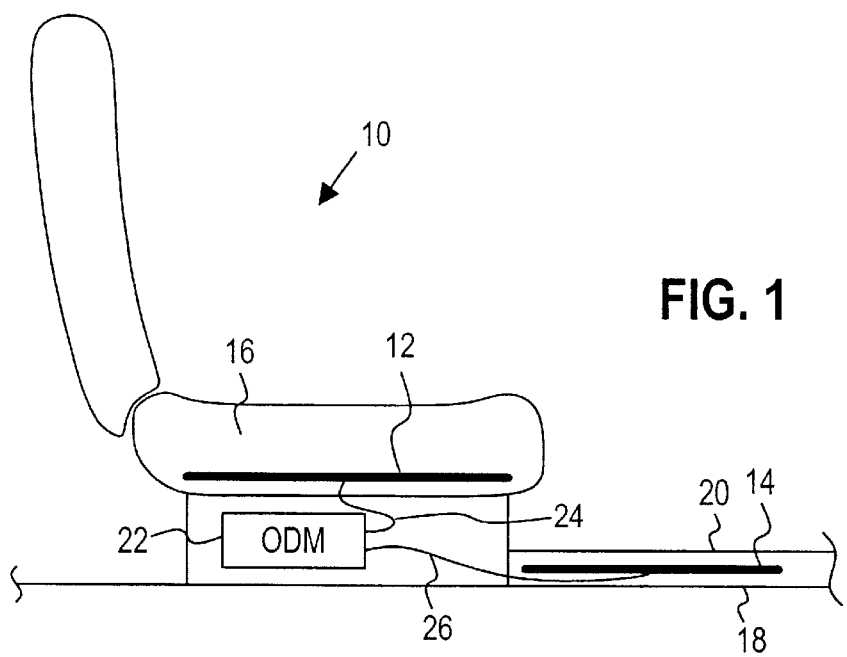
FIG. 1 is a diagram including a vehicle seat, a fluid-filled seat bladder for detecting occupant seat weight, a fluid-filled floor bladder for detecting floor weight, and a microprocessor-based occupant detection module (ODM) programmed to carry out the method of this invention.
Figure 2:
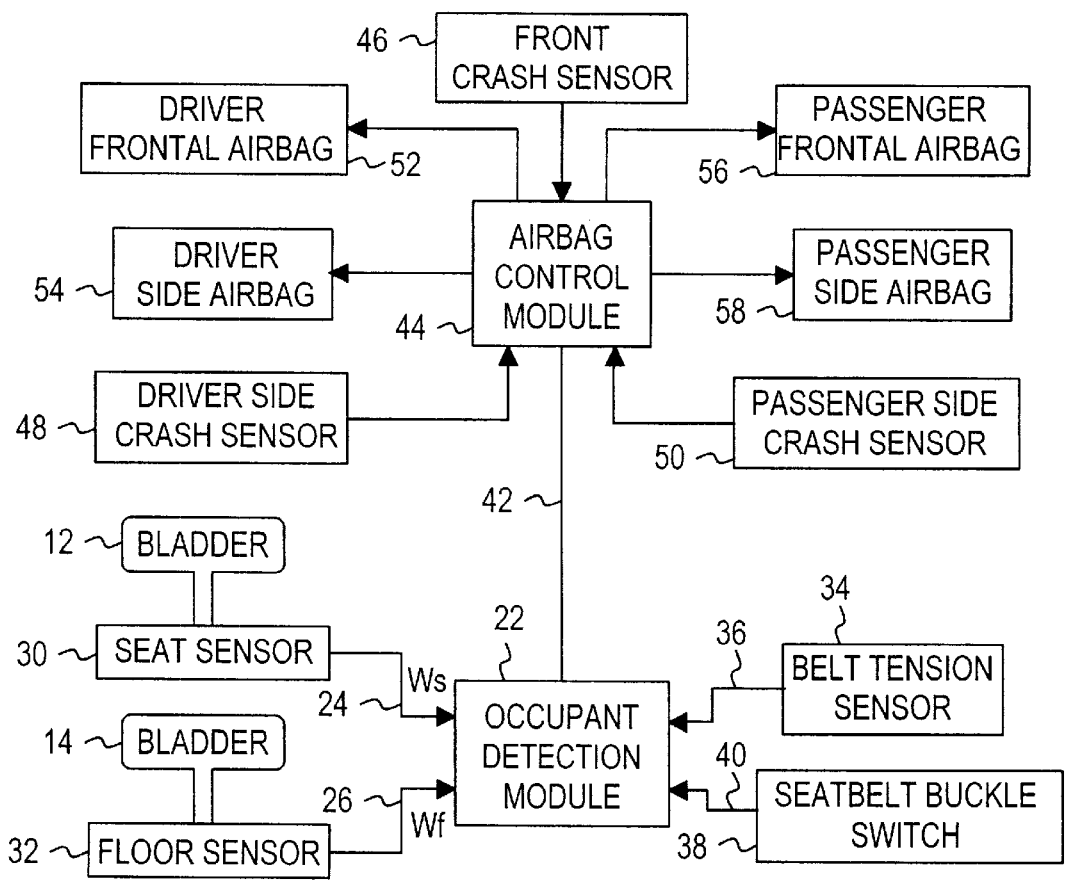
FIG. 2 is a diagram of a restraint system incorporating the bladders and ODM of FIG. 1.

FIG. 2 illustrates an exemplary restraint system incorporating fluid-filled bladders 12 and 14 and ODM 22. Referring to FIG. 2, the bladders 12 and 14 are shown coupled to respective seat and floor pressure sensors 30 and 32; the output of seat sensor 30 on line 24 is designated as seat weight Ws, and the output of floor sensor 32 on line 26 is designated as floor weight Wf. Other inputs supplied to ODM 22 include the output of a seat belt tension sensor 34 on line 36, and the output of a seat belt buckle switch 38 on line 40. The belt tension sensor 34 senses the tension in a seat belt (not shown) for seat 10, and is used primarily to detect the presence of a cinched down child or infant seat; see for example, the Research Disclosure No. 4 1402, October, 1998, Page 1304, incorporated herein by reference. The seat belt buckle switch 38 simply indicates if the seat belt is in use. Based on these inputs, ODM 22 generates a restraint status indication on line 42, which is applied as an input to airbag control module 44. Airbag control module 44 also receives inputs from a number of crash sensors 46, 48, 50, and in case of a severe crash event, triggers deployment of one or more inflatable restraints 52, 54, 56, 58.

The present invention is directed not only to the use of the floor weight sensor 14, 32, but also to a method of operation carried out by ODM 22 for suitably adjusting the measured occupant seat weight Ws based on the detected floor weight Wf. As indicated above, it is not readily apparent how to compensate Ws based on Wf since the occupant may place various objects such as sports equipment or a heavy purse or grocery bag on the floor 20, and the ODM 22 must somehow distinguish between weight applied to the floor by the occupant's feet and weight applied to the floor by extraneous objects. Such a method is illustrated by the flow diagram of FIG. 3, which represents a software routine executed by ODM 22 during each period of vehicle operation. In particular, execution of the routine begins in response to detection of an occupant entry condition Such as the opening of a vehicle door or an off-to-on transition of the vehicle ignition switch. At such time, the initialization block 100 is executed to initialize the restraint status output STATUS to INHIBIT, indicating that deployment of the restraints should be suppressed. Then, the blocks 102, 104, 106, 108 and 110 are repeatedly executed until the detected occupant seat weight Ws (which may be a filtered version of the measured pressure in seat bladder 12) becomes reasonably stable. The block 102 reads the seat and floor weight values Ws and Wf, and stores them as initial values Ws_init and Wf_init, respectively. Also, the estimated occupant weight EST_WT is set equal to Ws_init, a counter COUNT is reset to zero, and a maximum weight value MAX is determined according to the lesser of (Ws_init+Wf_init) and (K * Ws_init), where the term K preferably varies as a function of the typical amount of occupant weight off-loaded to the floor. As indicated above, clinical evaluation reveals that the off-loaded weight is typically about 30% of the full occupant weight, which corresponds to a K-value of 1.3. However, the degree of off-loading also varies fairly predictably with occupant weight and the height of the seat cushion 16 above the floor 20. In particular, off-loading tends to decrease with increasing seat height, and to increase with increasing weight above a certain value. Thus, in vehicles equipped with adjustable height seats, the term K may be varied (between 1.0 and 1.5, for example) as a function of both occupant seat weight Ws and the seat height.

As explained below, MAX is used to limit the amount by which EST_WT may be increased based on the detected floor weight Wf; the limit (Wsinit+Wf_init) recognizes that the full measured occupant weight in most cases cannot exceed the sum of the weights applied to the seat cushion 16 and the floor covering 20, and the limit (K * Ws_init) recognizes that the full measured occupant weight typically does not exceed the detected seat weight Ws by more than 30%. The blocks 104, 106 and 108 set the restraint system Output STATUS based on a comparison of EST_WT with a threshold THR corresponding to a specified weight, such as 105 pounds. If EST_WT exceeds THR, the block 108 sets STATUS to ALLOW, indicating that deployment of the restraints should be allowed for the occupant of seat 10; if EST_WT is less than or equal to THR, the block 106 sets STATUS to INHIBIT, indicating that deployment of the restraints for seat 10 should be suppressed. Of course, more sophisticated controls are also possible, such as comparing EST_WT to two or more thresholds for purposes of determining if the deployment force should be allowed but limited based on the occupant weight. The block 110 reads new values of Ws and Wf, stores them as Ws_new and Wf_new, respectively, and computes the change in seat and floor weights relative to the initial values Ws_init and Wf_init. Specifically, the change in occupant seat weight Ws_delta is determined according to the difference (Ws_new−Ws_init), and the change in floor weight Wf_delta is determined according to the difference (Wf_new−Wf_init). If block 112 determines that the magnitude of Ws_delta exceeds a threshold THRlarge corresponding to a relatively large shift in occupant seat weight, such as twenty-five pounds, the blocks 102, 104, 106, 108 and 110 are re-executed, as mentioned above.

Once the occupant seat weight detected by bladder 12 becomes reasonably stable, the block 112 will be answered in the negative, and the blocks 114 and 116 are executed to detect a shift in occupant weight. Block 114 compares the magnitude of Ws_delta to a threshold THRsmall corresponding to a relatively small shift in occupant weight, such as four pounds. If Ws_delta exceeds THRsmall (but is less than THRlarge), the block 116 determines if the occupant seat weight was shifted to or from the floor. If occupant weight is shifted from the floor to the seat, Ws_delta will be positive and Wf_delta will be negative; if occupant weight is shifted from the floor to the seat, Ws_delta will be negative and Wf delta will be positive. If either condition is detected, or if the one of the seat and floor weights increase with no change in the other weight, the block 116 is answered in the affirmative. In such case, the blocks 118 and 120 are executed to determine if the detected weight shift is sustained over a calibrated time interval such as five seconds. The block 118 increments COUNT and the block 120 determines if COUNT has reached a calibrated threshold THR_CAL corresponding to the calibrated time interval. Once block 120 has been answered in the affirmative, the block 122 is executed to increase EST_WT by a specified percentage P (such as 25%–50%, for example) of |Ws_delta| or |Wf_delta|, whichever is less. The block 122 also updates the maximum value MAX according to the lesser of the sum (Ws_new+Wf_new) and the product (K * Ws_new) to reflect the most recent values of Wf and Ws. If the revised value of EST_WT is less than or equal to MAX, as determined at block 126, the block 130 is executed to reset COUNT to zero, and the blocks 104–124 are re-executed to update STATUS and to monitor Wf and Ws for further weight shifting. If the revised value of EST_WT exceeds MAX, the block 128 additionally limits EST_WT to MAX before executing block 130 and re-executing blocks 104–124.

In the manner described above, the method of the present invention can be utilized to obtain a more accurate estimate of vehicle occupant weight for purposes of determining if inflatable restraints for the occupant should be allowed or suppressed in a detected crash event. Essentially, shifting of occupant weight after the detected occupant seat weight has stabilized indicates that the occupant weight is higher than the measured occupant seat weight Ws, regardless of whether other objects are also resting on the floor. Such weight shifting may occur, for example, when an occupant moves a foot and leg on or off the cushion 16. The estimated weight is revised upward in relation to the amount of weight shifting, but the amount of revision cannot increase the estimated weight above a maximum determined according to the lesser of the combined seat and floor weight and calibrated percentage above the measured occupant seat weight. This effectively limits the estimated weight to a reasonable value, thereby preventing unrealistic elevation of the estimated weight when an occupant repeatedly moves an object such as a heavy book-bag or purse between the cushion 16 and the floor 20.

While the method of the present invention has been illustrated in reference to the illustrated embodiment, it is expected that various modifications will occur to persons skilled in the art. For example, this invention is not limited to pressure based bladder systems, and may be applied equally well to other occupant detection systems and to variable deployment force restraints, as indicated above. Accordingly, it should be understood that occupant characterization methods incorporating these and other modifications may fall within the scope of this invention, which is defined by the appended claims.

What is claimed is:

1. A method of operation for an occupant detection system that allows or suppresses deployment of an inflatable restraint in a vehicle based on an estimate of occupant weight, the method comprising the steps of:

measuring a seat weight based on weight applied to a seat of the vehicle;

measuring a floor weight based on weight applied to a floor of the vehicle forward of the seat;

setting the estimate of occupant weight according to the measured seat weight;

monitoring the measured seat weight and measured floor weight during operation of the vehicle; and increasing the estimate of occupant weight to compensate at least in part for occupant weight off-loaded to the floor when the monitored weights indicate shifting of occupant weight.

2. The method of claim 1, wherein the seat weight is measured by sensing a fluid pressure in a seat bladder disposed in a bottom cushion of said seat, and the floor weight is measured by sensing a pressure in a floor bladder disposed on said floor forward of the seat.

3. The method of claim 1, wherein the step of setting the estimate of occupant weight includes the steps of:

initializing the estimate of occupant weight according to the measured seat weight;

detecting a change in the measured seat weight; and re-initializing the estimate of occupant weight according to the measured seat weight each time the detected change in measured seat weight exceeds a first threshold indicative of a relatively large weight change.

4. The method of claim 3, including the step of:

enabling detection of occupant weight shifting when the detected change in measured seat weight is between the first threshold and a second threshold that is lower than the first threshold.

5. The method of claim 1, including the steps of:

detecting instantaneous occupant weight shifting when the measured seat weight changes from the estimate of occupant weight by a specified amount, and the measured seat and floor weights change in opposite directions; and indicating shifting of occupant weight between the seat and floor when instantaneous occupant weight shifting is detected for a least a predetermined time interval.

6. The method of claim 1, wherein the step of increasing the estimate of occupant seat weight includes the steps of:

detecting changes in the measured seat and floor weights; and increasing the estimate of occupant seat weight according to the change in the measured seat weight or the change in the measured floor weight, whichever is less.

7. The method of claim 1, including the step of:

limiting said increasing of the estimate of occupant weight Such that the estimate of occupant weight does not exceed a sum of the measured seat and floor weights.

8. The method of claim 1, including the step of:

limiting said increasing of the estimate of occupant weight such that the estimate of occupant weight does not exceed the measured seat weight by a specified percentage.

9. The method of claim 8, wherein the specified percentage is varied as a function of the measured seat weight.

10. The method of claim 8, wherein the seat has a height with respect to the floor that is adjustable, and the specified percentage is varied as a function of the measured seat weight and the seat height.

* * * * *